(12) United States Patent
Moreaux

(10) Patent No.: US 10,371,422 B2
(45) Date of Patent: Aug. 6, 2019

(54) CONDENSER WITH TUBE SUPPORT STRUCTURE

(71) Applicant: Daikin Applied Americas Inc., Minneapolis, MN (US)

(72) Inventor: Louis A. Moreaux, Minneapolis, MN (US)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 46 days.

(21) Appl. No.: 15/430,718

(22) Filed: Feb. 13, 2017

(65) Prior Publication Data

US 2018/0231280 A1    Aug. 16, 2018

(51) Int. Cl.
| | |
|---|---|
| *F25B 39/00* | (2006.01) |
| *F28F 9/013* | (2006.01) |
| *B01D 5/00* | (2006.01) |
| *F28F 17/00* | (2006.01) |
| *F28B 1/02* | (2006.01) |
| *F28B 9/08* | (2006.01) |
| *F28D 7/16* | (2006.01) |

(Continued)

(52) U.S. Cl.
CPC ............. *F25B 39/00* (2013.01); *B01D 1/04* (2013.01); *B01D 1/28* (2013.01); *B01D 5/0009* (2013.01); *B01D 5/009* (2013.01); *F28B 1/02* (2013.01); *F28B 9/08* (2013.01); *F28D 7/16* (2013.01); *F28F 9/0131* (2013.01); *F28F 17/005* (2013.01); *F25B 25/005* (2013.01); *F25B 39/04* (2013.01); *F25B 2339/046* (2013.01);

(Continued)

(58) Field of Classification Search
CPC .... F25B 39/00; F25B 39/04; F25B 2339/046; F25B 2339/047; F28F 9/0131; F28D 7/1607; F28D 7/1676
USPC ........................................ 165/162, 159, 161
See application file for complete search history.

(56) References Cited

U.S. PATENT DOCUMENTS

| | | | |
|---|---|---|---|
| 1,525,094 A | 2/1925 | Jones | |
| 2,384,714 A * | 9/1945 | Villiger | ..................... F28F 9/22 159/28.2 |

(Continued)

FOREIGN PATENT DOCUMENTS

| | | |
|---|---|---|
| CN | 102538562 A | 7/2012 |
| EP | 2 955 469 A1 | 12/2015 |

(Continued)

OTHER PUBLICATIONS

International Search Report for the corresponding international application No. PCT/US2018/013958, dated Apr. 9, 2018.

(Continued)

*Primary Examiner* — Joel M Attey
(74) *Attorney, Agent, or Firm* — Global IP Counselors, LLP

(57) ABSTRACT

A condenser for a vapor compression system includes a shell, a tube bundle, and a tube support structure. The shell has a refrigerant inlet and a refrigerant outlet. The tube bundle includes a plurality of heat transfer tubes disposed inside the shell. Refrigerant discharged from the refrigerant inlet is supplied onto the tube bundle. The heat transfer tubes extend generally parallel to the longitudinal center axis of the shell. The tube support structure is configured and arranged to support the plurality of heat transfer tubes in the tube bundle within the shell. The tube support structure includes at least one tube support plate inclined relative to a vertical direction perpendicular to the longitudinal center axis of the shell.

14 Claims, 11 Drawing Sheets

(51) Int. Cl.
    *B01D 1/04*     (2006.01)
    *B01D 1/28*     (2006.01)
    *F25B 39/04*     (2006.01)
    *F28F 9/22*     (2006.01)
    *F28D 21/00*     (2006.01)
    *F25B 25/00*     (2006.01)

(52) U.S. Cl.
    CPC ...... *F25B 2339/047* (2013.01); *F28D 7/1607* (2013.01); *F28D 7/1676* (2013.01); *F28D 2021/007* (2013.01); *F28D 2021/0063* (2013.01); *F28F 2009/226* (2013.01); *F28F 2009/228* (2013.01)

(56) References Cited

U.S. PATENT DOCUMENTS

| | | | | |
|---|---|---|---|---|
| 2,693,942 | A | * | 11/1954 | Guala .................. F28F 9/22 165/159 |
| 5,509,466 | A | * | 4/1996 | McQuade ............ F25B 39/04 165/112 |
| 6,827,138 | B1 | | 12/2004 | Master et al. |
| 2001/0049944 | A1 | | 12/2001 | Shirakata et al. |
| 2008/0173436 | A1 | | 7/2008 | Baylis et al. |
| 2009/0049861 | A1 | | 2/2009 | Luo et al. |
| 2013/0174552 | A1 | * | 7/2013 | Mahmoud ............ F01K 23/02 60/671 |
| 2014/0127059 | A1 | | 5/2014 | Haley et al. |

FOREIGN PATENT DOCUMENTS

FR          984248 A     7/1951
WO    2009148822 A2     12/2009

OTHER PUBLICATIONS

Written Opinion for the corresponding international application No. PCT/US2018/013956, dated Apr. 9, 2018.

* cited by examiner

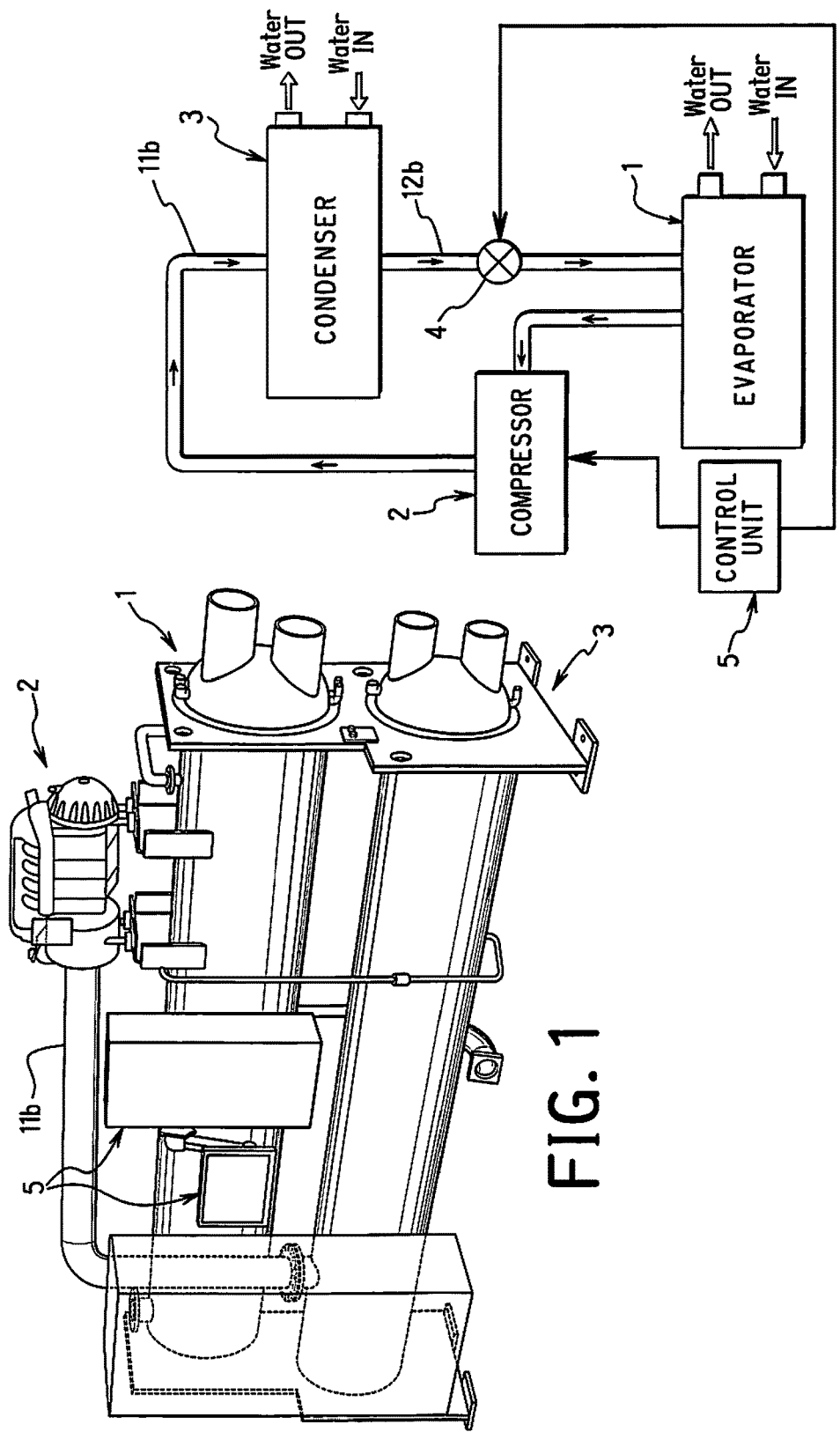

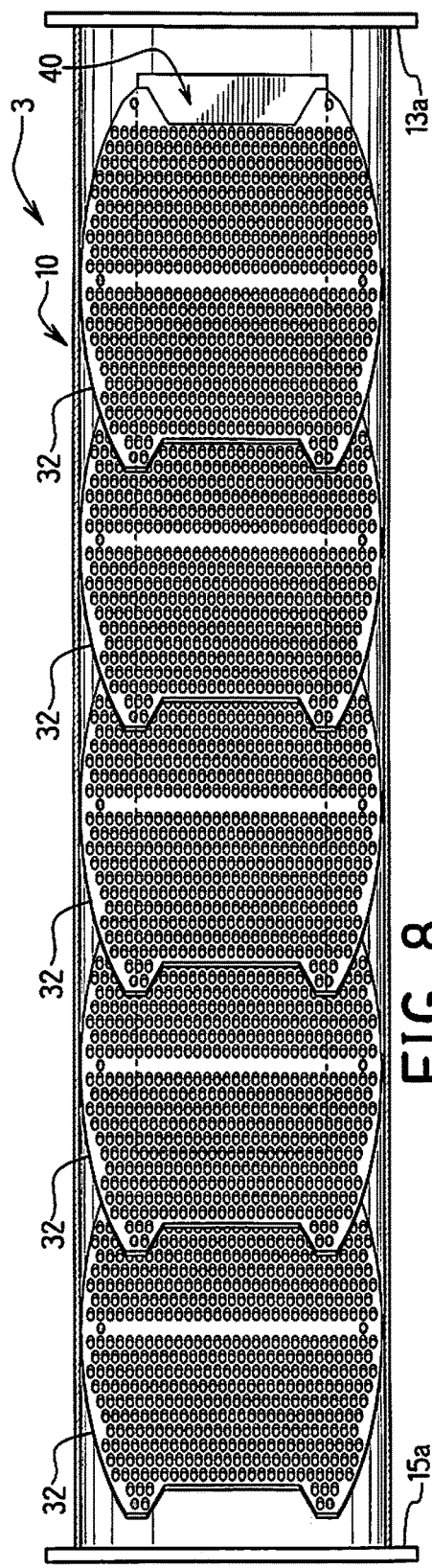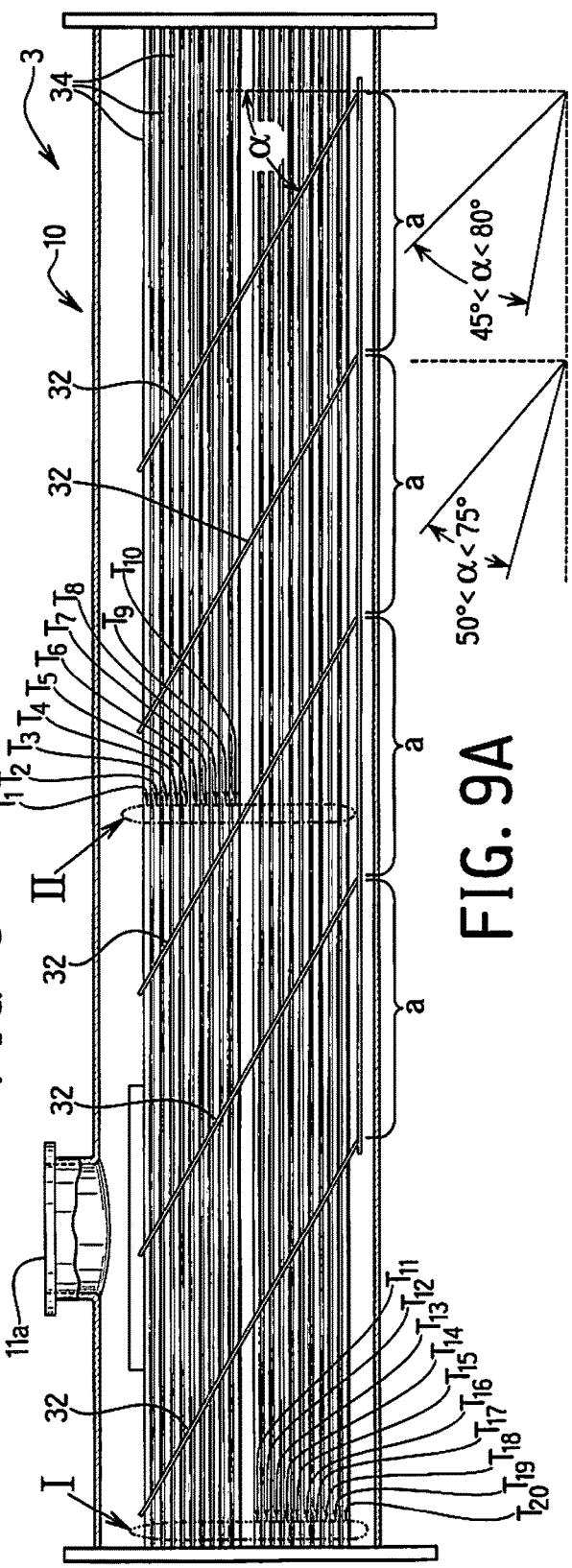

CONDENSER WITH TUBE SUPPORT STRUCTURE

BACKGROUND OF THE INVENTION

Field of the Invention

This invention generally relates to a condenser adapted to be used in a vapor compression system. More specifically, this invention relates to a condenser with a tube support structure.

Background Information

Vapor compression refrigeration has been the most commonly used method for air-conditioning of large buildings or the like. Conventional vapor compression refrigeration systems are typically provided with a compressor, a condenser, an expansion valve, and an evaporator. The compressor compresses refrigerant and sends the compressed refrigerant to the condenser. The condenser is a heat exchanger that allows compressed vapor refrigerant to condense into liquid. A heating/cooling medium such as water typically flows through the condenser and absorbs heat from the refrigerant to allow the compressed vapor refrigerant to condense. The liquid refrigerant exiting the condenser flows to the expansion valve. The expansion valve expands the refrigerant to cool the refrigerant. The refrigerant from the expansion valve flows to the evaporator. This refrigerant is often two-phase. The evaporator is a heat exchanger that allows the refrigerant to evaporate from liquid to vapor while absorbing heat from the heating/cooling medium passing through the evaporator. The refrigerant then returns to the compressor. The heating/cooling medium can be used to heat/cool the building. U.S. Patent Application Publication No. 2014/0127059 illustrates a typical system.

The condenser often includes many heat transfer tubes to improve the heat transfer performance. U.S. Patent Application Publication No. 2001/0049944 illustrates a plurality of heat transfer tubes arranged in bundles with a plate provided between the bundles. U.S. Patent Application Publication No. 2009/0049861 illustrates a plurality of heat transfer tubes stacked up in the available space within the condenser with a vertical support plate supporting the heat transfer tubes.

SUMMARY OF THE INVENTION

It has been discovered that in a condenser heat transfer performance can be improved by allowing condensed liquid refrigerant to be drained quickly.

Therefore, one object of the present invention is to provide a condenser with a tube support structure including an inclined tube support plate and excellent heat transfer performance.

It has been further discovered that as more liquid refrigerant falls downward from upper heat transfer tubes to lower heat transfer tubes, the liquid refrigerant forms a thick layer around the lower heat transfer tubes, which can deteriorate heat transfer performance due to insulation caused by such a layer of the liquid refrigerant.

Therefore, another object of the present invention is to provide a condenser with a tube support structure in which a plurality of tube support plates are arranged such that liquid refrigerant can be prevented from falling downward from upper heat transfer tubes to lower heat transfer tubes and forming a thick refrigerant layer around the lower heat transfer tubes.

One or more of the above objects can basically be attained by providing condenser adapted to be used in a vapor compression system. The condenser includes a shell, a tube bundle, and a tube support structure. The shell has a refrigerant inlet that at least refrigerant with gas refrigerant flows therethrough and a refrigerant outlet that at least refrigerant with liquid refrigerant flows therethrough, with a longitudinal center axis of the shell extending generally parallel to a horizontal plane. The tube bundle includes a plurality of heat transfer tubes disposed inside of the shell so that the refrigerant discharged from the refrigerant inlet is supplied onto the tube bundle. The heat transfer tubes extend generally parallel to the longitudinal center axis of the shell. The tube support structure is configured and arranged to support the plurality of heat transfer tubes in the tube bundle within the shell. The tube support structure includes at least one tube support plate inclined relative to a vertical direction perpendicular to the longitudinal center axis of the shell.

These and other objects, features, aspects, and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 1 is a simplified, overall perspective view of a vapor compression system including a condenser according to an embodiment of the present invention;

FIG. 2 is a block diagram illustrating a refrigeration circuit of the vapor compression system including the condenser according to the embodiment of the present invention;

FIG. 8 is a cross sectional view of the condenser illustrated in FIGS. 1-6, with the heat transfer tubes and refrigerant distributor removed for the purpose of illustration, as seen from above along section line 8-8 in FIG. 4;

FIG. 9A is a simplified side view of an internal structure of the condenser illustrated in FIGS. 1-6 and 8, with the refrigerant distributor removed for the purpose of illustration;

DETAILED DESCRIPTION OF EMBODIMENT(S)

Figure 3:
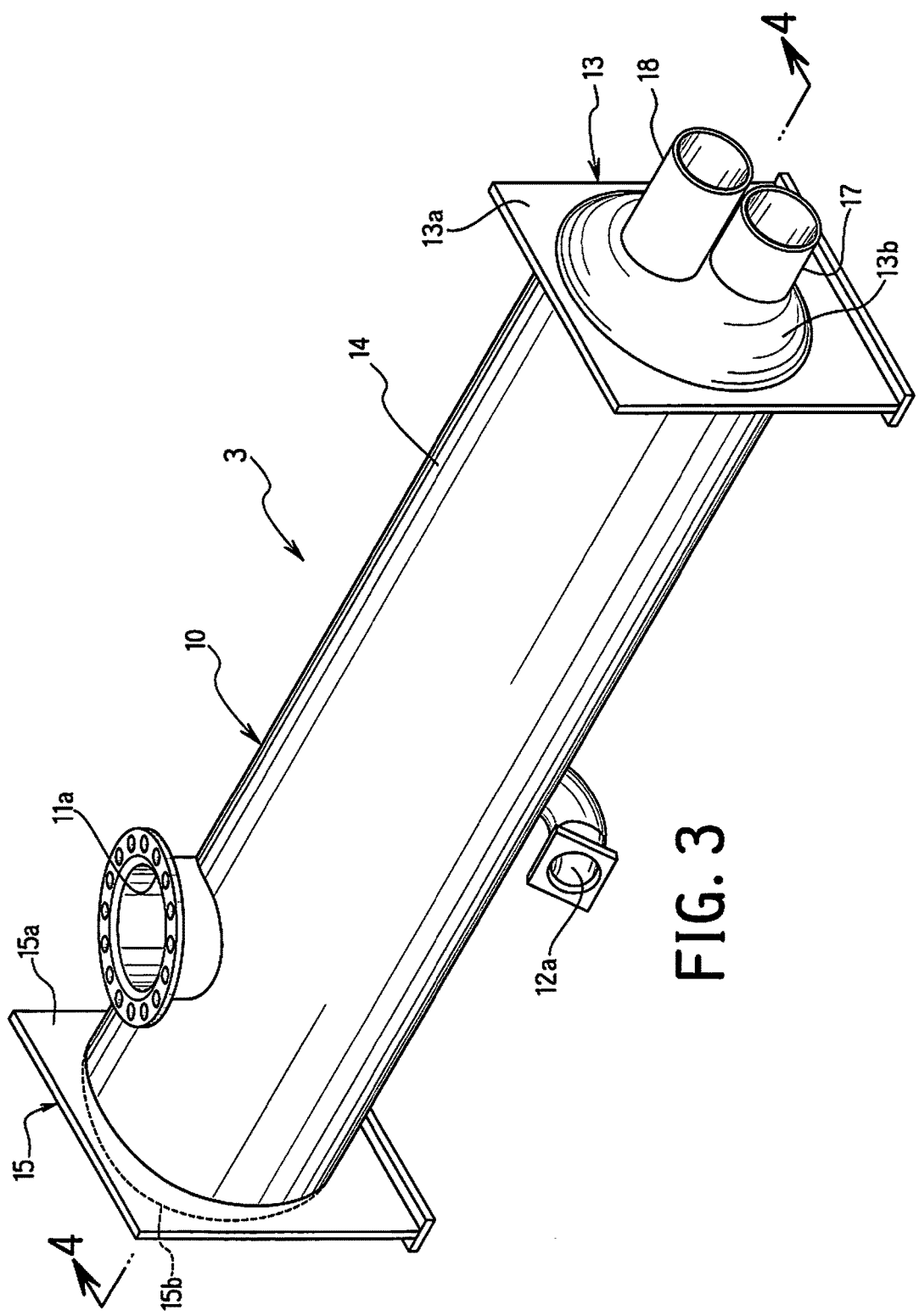
FIG. 3 is a simplified perspective view of the condenser according to the embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 and 2, a vapor compression system including a condenser 3 according to an embodiment will be explained. As seen in FIG. 1, the vapor compression system according to the embodiment is a chiller that may be used in a heating, ventilation and air conditioning (HVAC) system for air-conditioning of large buildings and the like. The vapor compression system of the embodiment is configured and arranged to remove heat from liquid to be cooled (e.g., water, ethylene glycol, brine, etc.) via a vapor-compression refrigeration cycle, and to add heat to liquid to be heated (e.g., water, ethylene glycol, calcium chloride brine, etc.) via a vapor-compression refrigeration cycle. Water is shown in the illustrated embodiment. However, it will be apparent to those skilled in the art from this disclosure that other liquids can be used. Heating and cooling of the liquid is shown in the illustrated embodiment.

As shown in FIGS. 1 and 2, the vapor compression system includes the following main components: an evaporator 1, a compressor 2, the condenser 3, an expansion device 4, and a control unit 5. The control unit 5 is operatively coupled to a drive mechanism of the compressor 2 and the expansion device 4 to control operation of the vapor compression system. The control unit may also be connected to various other components such as sensors and/or optional components of the system not shown.

The evaporator 1 is a heat exchanger that removes heat from the liquid to be cooled (in this example, water) passing through the evaporator 1 to lower the temperature of the water as a circulating refrigerant evaporates in the evaporator 1. The refrigerant entering the evaporator 1 is typically in a two-phase gas/liquid state. The refrigerant at least includes liquid refrigerant. The liquid refrigerant evaporates as the vapor refrigerant in the evaporator 1 absorbs heat from the cooling medium such as water. In the illustrated embodiment, the evaporator 1 uses water as a heating/cooling medium as mentioned above. The evaporator 1 can be any one of numerous conventional evaporators, such as a falling film evaporator, flooded evaporator, hybrid evaporator, etc. The water exiting the evaporator is cooled. This cooled water can then be used to cool the building or the like.

Upon exiting the evaporator 1, the refrigerant will be low pressure low temperature vapor refrigerant. The low pressure, low temperature vapor refrigerant is discharged from the evaporator 1 and enters the compressor 2 by suction. In the compressor 2, the vapor refrigerant is compressed to the higher pressure, higher temperature vapor. The compressor 2 may be any type of conventional compressor, for example, centrifugal compressor, scroll compressor, reciprocating compressor, screw compressor, etc.

Next, the high temperature, high pressure vapor refrigerant enters the condenser 3, which is another heat exchanger, which removes heat from the vapor refrigerant causing it to condense from a gas state to a liquid state. The condenser 3 in the illustrated embodiment is liquid cooled using a liquid such as water. The heat of the compressed vapor refrigerant raises the temperature of cooling water passing through the condenser 3. Usually, the hot water from the condenser is routed to a cooling tower to reject the heat to the atmosphere. In addition, optionally, the heated water (cooling water that cools the refrigerant) can be used in a building as a hot water supply or to heat the building.

The condensed liquid refrigerant then enters the expansion device 4 where the refrigerant undergoes an abrupt reduction in pressure. The expansion device 4 may be as simple as an orifice plate or as complicated as an electronic modulating thermal expansion valve. Whether the expansion device 4 is connected to the control unit will depend on whether a controllable expansion device 4 is utilized. The abrupt pressure reduction usually results in partial expansion of the liquid refrigerant, and thus, the refrigerant entering the evaporator 1 is usually in a two-phase gas/liquid state.

Some examples of refrigerants used in the vapor compression system are hydrofluorocarbon (HFC) based refrigerants, for example, R410A, R407C, and R134a, hydrofluoro olefin (HFO), unsaturated HFC based refrigerant, for example, R1234ze, and R1234yf, and natural refrigerants, for example, R717 and R718. R1234ze, and R1234yf are mid density refrigerants with densities similar to R134a. R450A and R513A are mid pressure refrigerants that are also possible refrigerants. A so-called Low Pressure Refrigerant (LPR) R1233zd is also a suitable type of refrigerant. Low Pressure Refrigerant (LPR) R1233zd is sometimes referred to as Low Density Refrigerant (LDR) because R1233zd has a lower vapor density than the other refrigerants mentioned above. R1233zd has a density lower than R134a, R1234ze, and R1234yf, which are so-called mid density refrigerants. The density being discussed here is vapor density not liquid density because R1233zd has a slightly higher liquid density than R134A. While the embodiment(s) disclosed herein are useful with any type of refrigerant, the embodiment(s) disclosed herein are particularly useful when used with LPR such as R1233zd. R1233zd is not flammable. R134a is also not flammable. However, R1233zd has a global warming potential GWP <10. On the Other hand, R134a has a GWP of approximately 1300. Refrigerants R1234ze, and R1234yf are slightly flammable even though their GWP is less than 10 like R1233zd. Therefore, R1233zd is a desirable refrigerant due to these characteristics, non-flammable and low GWP.

Figure 10:
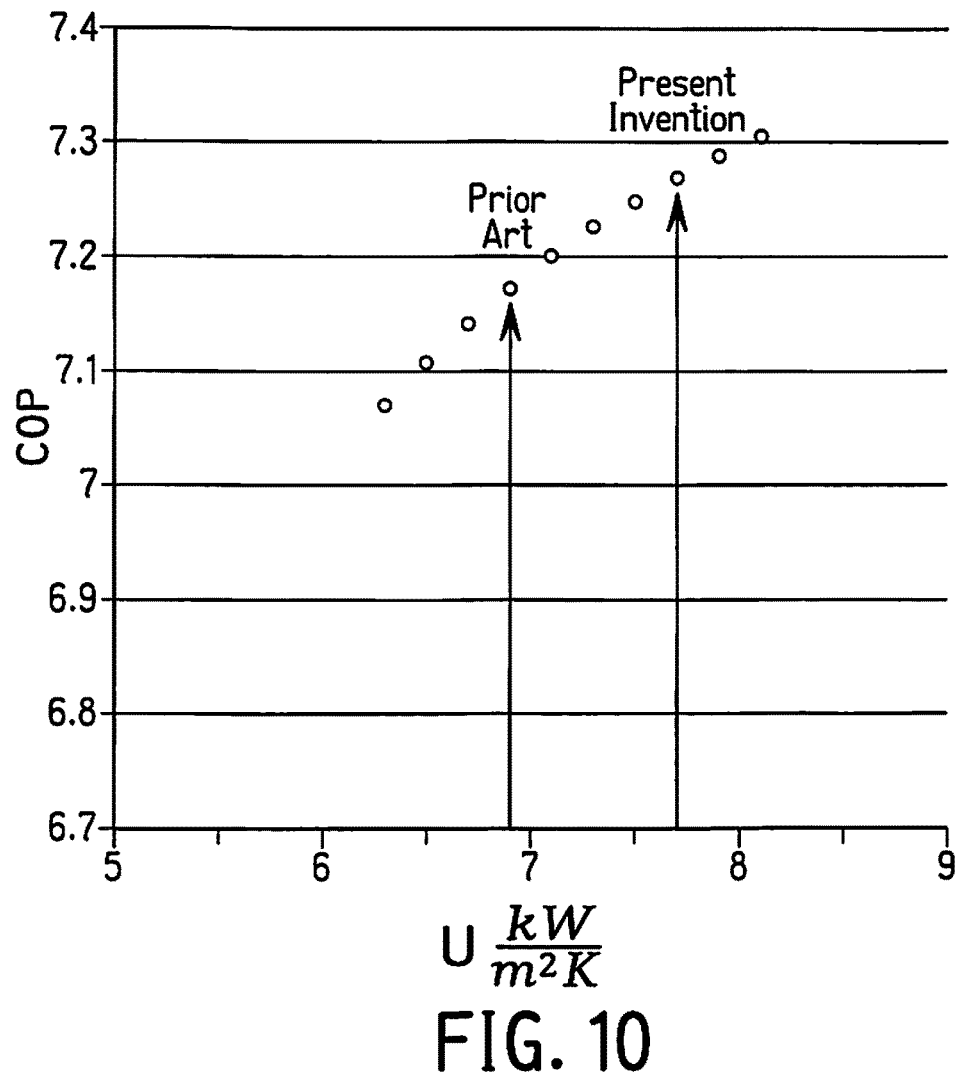
FIG. 10 is a graph illustrating a relationship between coefficient of performance (COP) and tube bundle heat transfer performance.

While individual refrigerants are mentioned above, it will be apparent to those skilled in the art from this disclosure that a blended refrigerant utilizing any two or more of the above refrigerants may be used. For example, a blended refrigerant including only a portion as R1233zd could be utilized. In any case, in the illustrated embodiment, the refrigerant preferably includes R1233zd. More preferably, in the illustrated embodiment, the refrigerant preferably is R1233zd. As mentioned above, R1233zd is a desirable refrigerant due to its low GWP and not being flammable. However, in a condenser in which a maximum number of heat transfer tubes are included (to try to maximize efficiency) as shown in FIG. 10, it has been discovered that a relatively large pressure drop occurs because the tubes may prevent the vapor around those tubes from flowing easily, which can cause a large pressure drop between the compressor outlet and the condenser tubes. A relatively large pressure drop decreases cycle efficiency, and thus, it has been discovered that it is desirable to reduce the pressure drop. If vapor can flow around the tubes, the vapor pressure drop between the compressor discharge and the condenser tubes can be reduced, and thus cycle efficiency will not be reduced (cycle efficiency can be generally maintained).

It will be apparent to those skilled in the art from this disclosure that conventional compressor, evaporator and expansion device may be used respectively as the compressor 2, the evaporator 1 and the expansion device 4 in order to carry out the present invention. In other words, the compressor 2, the evaporator 1 and the expansion device 4 are conventional components that are well known in the art. Since the compressor 2, the evaporator 1 and the expansion device 4 are well known in the art, these structures will not be discussed or illustrated in detail herein. Rather, it will be apparent to those skilled in the art from this disclosure that any suitable compressor, evaporator and expansion device can be used with the condenser of the illustrated embodiment. Therefore, the following descriptions will focus on the condenser 3 in accordance with the present invention. In addition, it will be apparent to those skilled in the art from this disclosure that the vapor compression system may include a plurality of evaporators 1, compressors 2 and/or condensers 3 without departing the form the scope of the present invention.

Referring now to FIGS. 3-8, the detailed structure of the condenser 3 according to the embodiment will be explained. The condenser 3 basically includes a shell 10, a refrigerant distributor 20, and a heat transferring unit 30. In the illustrated embodiment, the heat transferring unit 30 is a tube bundle. Thus, the heat transferring unit 30 will also be referred to as the tube bundle 30 herein. As mentioned above, in the illustrated embodiment, the tube bundle 30 carries a liquid cooling/heating medium such as water therethrough.

Refrigerant enters the shell 10 and is supplied to the refrigerant distributor 20. The refrigerant distributor 20 is configured to relatively evenly distribute the refrigerant onto the tube bundle 30, as explained in more detail below. The refrigerant entering the shell 10 of the condenser 3 is a compressed gas (vapor) refrigerant that is typically at high pressure and high temperature. The vapor refrigerant will exit the distributor 20 and flow into the interior of the shell 10 onto the tube bundle 30. The vapor refrigerant will gradually cool and condense as it flows down over the tube bundle 30. The medium (water) in the tube bundle 30 absorbs heat from the vapor refrigerant to cause this condensation and cooling to occur. The condensed liquid refrigerant will then exit the bottom of the condenser, as explained in more detail below.

Figure 4:
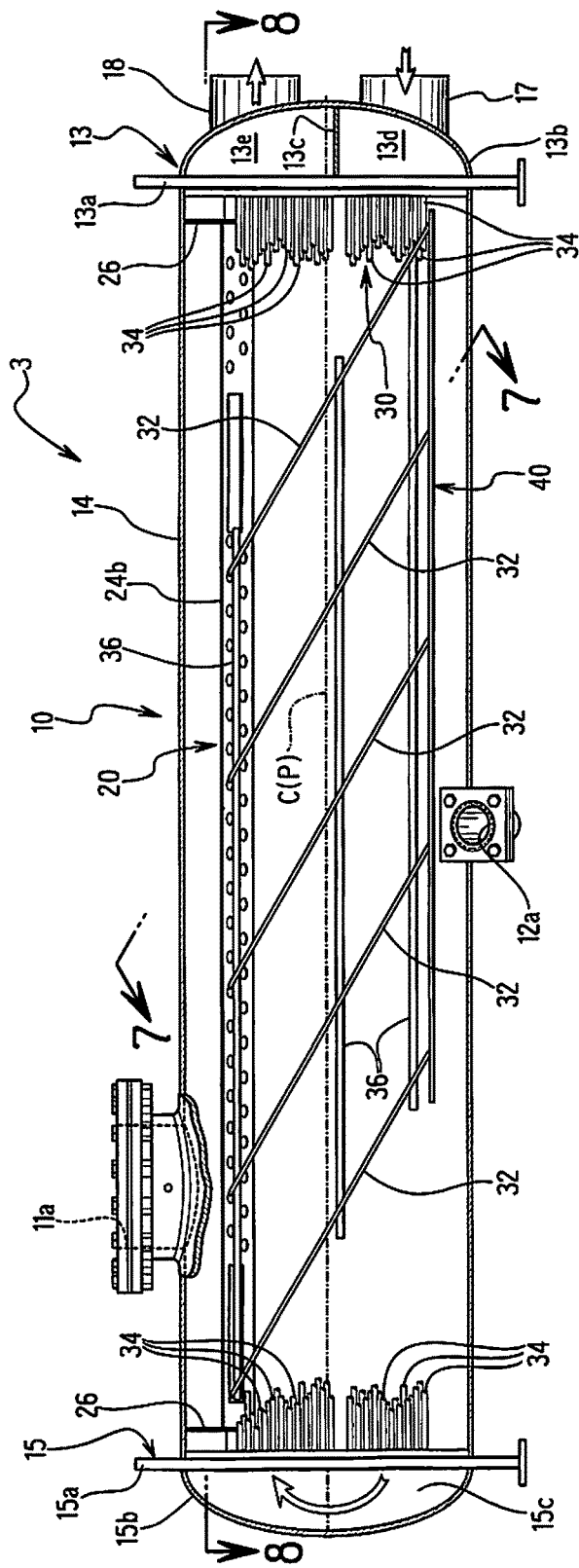
FIG. 4 is a simplified longitudinal cross sectional view of the condenser illustrated in FIGS. 1-3, with tubes broken away for the purpose of illustration, as seen along section line 4-4 in FIG. 3.
Figure 5:
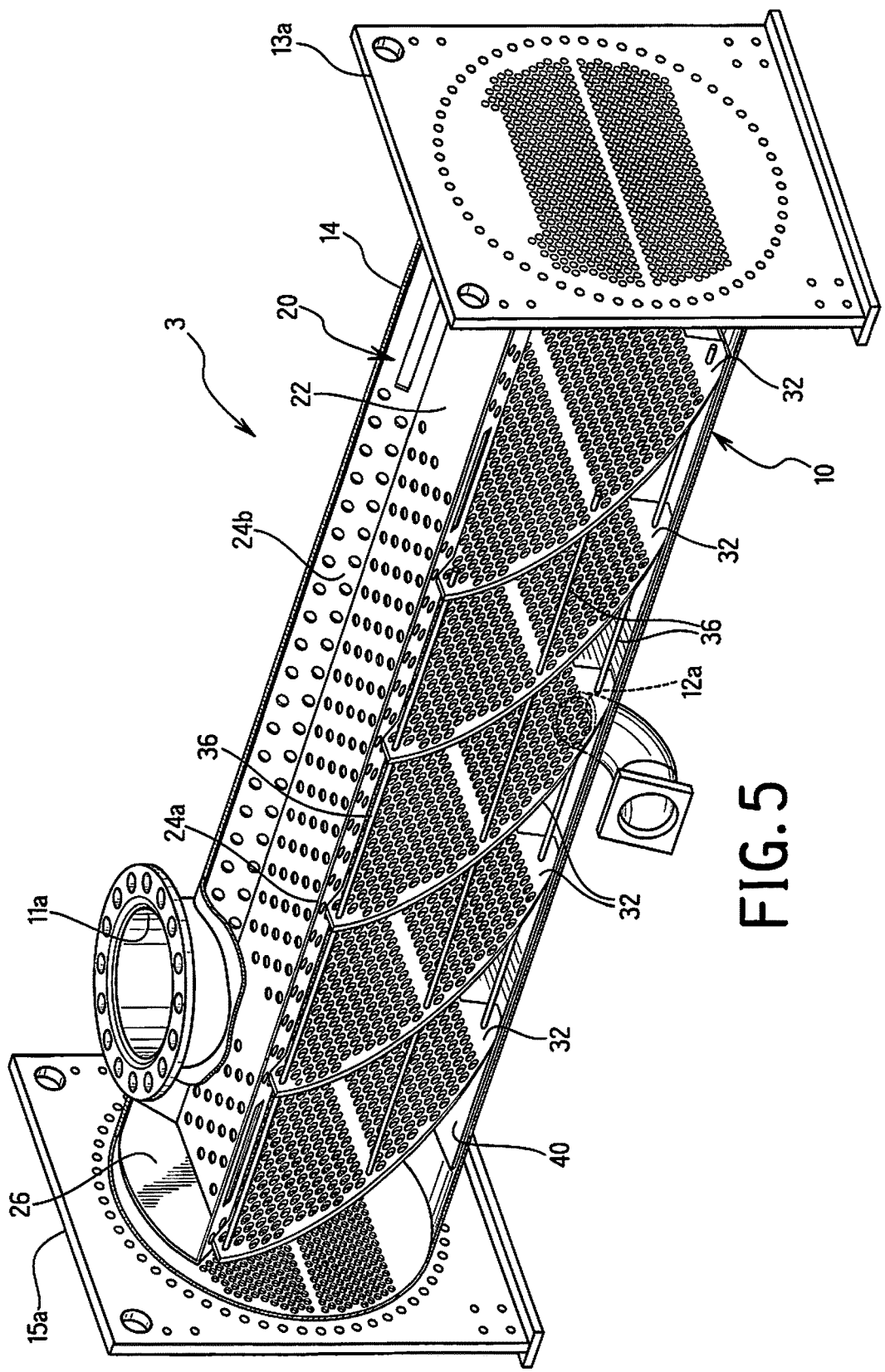
FIG. 5 is a simplified perspective view of an internal structure of the condenser illustrated in FIGS. 1-4, but with the heat transfer tubes removed for the purpose of illustration.

As best understood from FIGS. 3-5, in the illustrated embodiment, the shell 10 has a generally cylindrical shape with a longitudinal center axis C (FIG. 4) extending generally in the horizontal direction. Thus, the shell 10 extends generally parallel to a horizontal plane P and the center axis C is generally parallel to the horizontal plane P. The shell 10 includes a connection head member 13, a cylindrical body 14, and a return head member 15. The cylindrical body 14 is hermetically attached between the connection head member 13 and the return head member 15. Specifically, the connection head member 13 and the return head member 15 are hermetically fixedly coupled to longitudinal ends of the cylindrical body 14 of the shell 10.

The connection head member 13 includes an attachment plate 13a, a dome part 13b attached to the attachment plate 13a and a divider plate 13c extending between the attachment plate 13a and the dome part 13b to define an inlet chamber 13d and an outlet chamber 13e. The attachment plate 13a is normally a tube sheet that is normally welded to the cylindrical body 14. The dome part 13b is normally attached to the tube sheet (attachment plate) 13a using bolts and a gasket (not shown) disposed therebetween. The divider plate 13c is normally welded to the dome part 13b. The inlet chamber 13d and the outlet chamber 13e are divided from each other by the divider plate 13c. The return head member 15 also includes an attachment plate 15a and a dome member 15b attached to the attachment plate 15a to define a return chamber 15c. The attachment plate 15a is normally a tube sheet that is normally welded to the cylindrical body 14. The dome part 15b is normally attached to the tube sheet (attachment plate) 15a using bolts and a gasket (not shown) disposed therebetween. The return head member 15 does not include a divider. Thus, thee attachment plates 13a and 15a are fixedly coupled to longitudinal ends of the cylindrical body 14 of the shell 10. The inlet chamber 13d and the outlet chamber 13e are partitioned by the divider plate (baffle) 13c to separate flow of the cooling medium. Specifically, the connection head member 13 is fluidly connected to both an inlet pipe 17 through which water enters and a water outlet pipe 18 through which the water is discharged from the shell 10. More specifically, the inlet chamber 13d is fluidly connected to the inlet pipe 17, and the outlet chamber 13e is fluidly connected to the outlet pipe 18, with the divider plate 13c dividing the flows.

The attachment plates 13a and 15a include a plurality of holes with heat transfer tubes 34 mounted therein. For example, the heat transfer tubes 34 can be positioned in the holes and then roller expanded to secure the tubes 34 within the holes and form a seal therebetween. A lower group of the heat transfer tubes 34 receive water from the inlet chamber 13d and carry the water through the cylindrical body 14 to the return chamber 15c. The water in the return chamber 15c then flows into an upper group of the heat transfer tubes 34 back through the cylindrical body 14 and into the outlet chamber 13e. Thus, in the illustrated embodiment, the condenser 3 is a so-called "two pass" condenser 3. The flow path of the water is hermetically sealed from an interior space of the cylindrical body 14 between the attachment plates 13a and 15a. This interior space contains refrigerant hermetically sealed from the water flow path. Thus, the tube bundle 30 includes an upper group of the heat transfer tubes 34 and a lower group of the heat transfer tubes 34 disposed below the upper group of the heat transfer tubes 34.

In the illustrated embodiment, the upper group of the heat transfer tubes is disposed at or above a vertical middle plane (e.g., the plane P in FIG. 4) of the shell 10, and the lower group of the heat transfer tubes 34 is disposed at or below the vertical middle plane (e.g., the plane P in FIG. 4) of the shell 10. More specifically, in the illustrated embodiment, the upper group of the heat transfer tubes is disposed at and above a vertical middle plane (e.g., the plane P in FIG. 4) of the shell 10, and the lower group of the heat transfer tubes 34 is disposed below the vertical middle plane (e.g., the plane P in FIG. 4) of the shell 10. In the illustrated embodiment, the upper and lower groups are separated by a gap and have generally the same number of heat transfer tubes 34 in each group.

The shell 10 further includes a refrigerant inlet 11a connected to a refrigerant inlet pipe 11b and a refrigerant outlet 12a connected to a refrigerant outlet pipe 12b. The refrigerant inlet pipe 11b is fluidly connected to the compressor 2 to introduce compressed vapor gas refrigerant supplied from the compressor 2 into the top of the shell 10. From the refrigerant inlet 11a the refrigerant flows into the refrigerant distributor 20, which distributes the refrigerant over the tube bundle 30. The refrigerant condenses due to heat exchange with the tube bundle 30. Once condensed within the shell 10, liquid refrigerant exits the shell 10 through the refrigerant outlet 12a and flows into the refrigerant outlet pipe 12b. The expansion device 4 is fluidly coupled to the refrigerant outlet pipe 12b to receive the liquid refrigerant. The refrigerant that enters the refrigerant inlet 11a includes at least gas refrigerant. The refrigerant that flows through the refrigerant outlet 12a includes at least liquid refrigerant. Thus, the shell 10 has a refrigerant inlet 11a that at least refrigerant with gas refrigerant flows therethrough and a refrigerant outlet 12a that at least refrigerant with liquid refrigerant flows therethrough, with a longitudinal center axis C of the shell extending generally parallel to the horizontal plane P.

Figure 6:
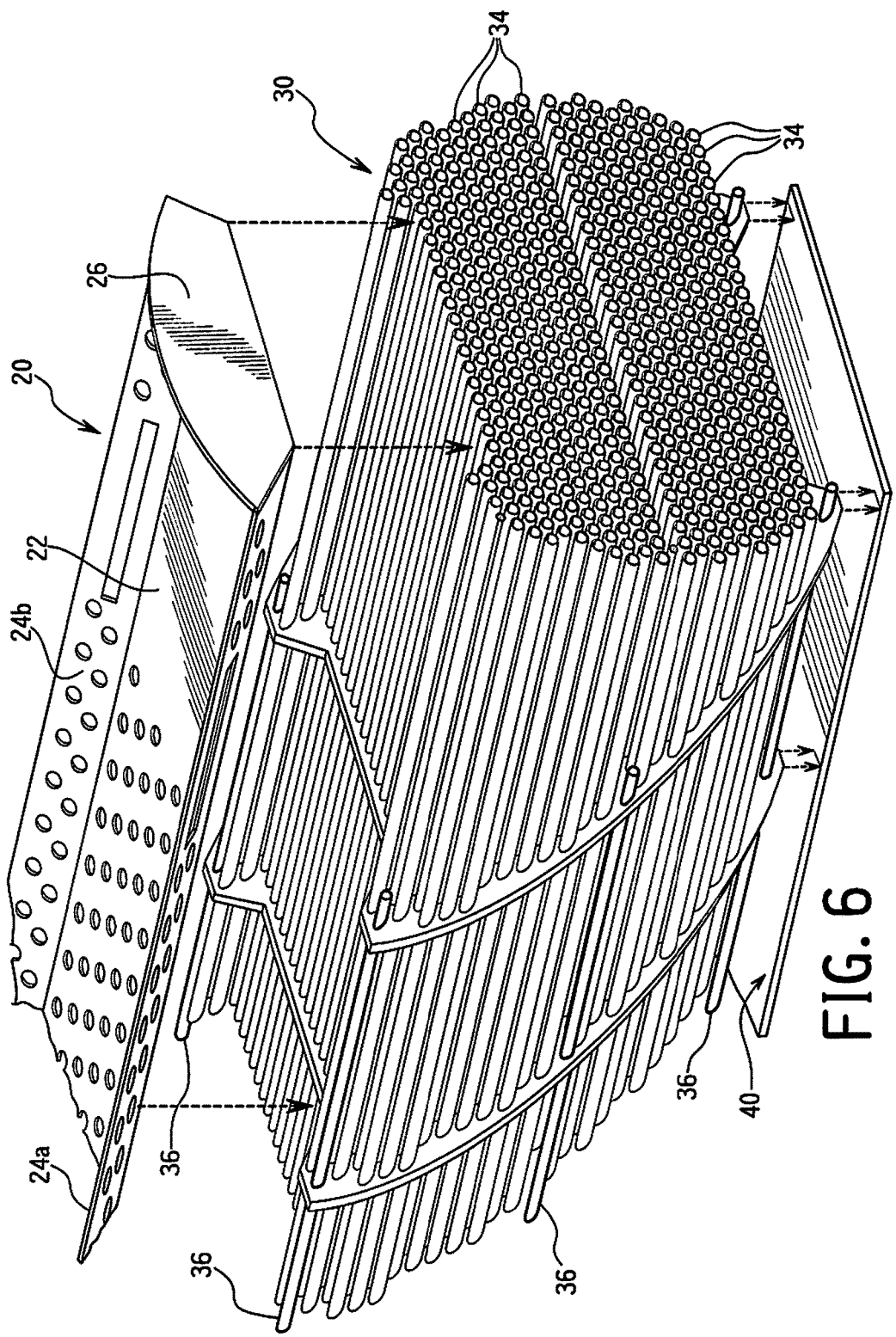
FIG. 6 is an enlarged, simplified, exploded partial perspective view of an internal structure of the condenser, i.e., the tubes and tube support structure, illustrated in FIGS. 1-5.

Referring now to FIGS. 4-6, the refrigerant distributor 20 is fluidly connected to the refrigerant inlet 11a and is disposed within the shell 10. The refrigerant distributor 20 is arranged and configured with a dish configuration to receive the refrigerant entering the shell 10 through the refrigerant inlet 11a. The refrigerant distributor 20 extends longitudinally within the shell 10 generally parallel to the longitudinal center axis C of the shell 10. As best shown in FIGS. 4-6, the refrigerant distributor 20 includes a base part 22, a first side part 24a, a second side part 24b, and a pair of end parts 26. The base part 22, first side part 24a, the second side part 24b, and the pair of end parts 26 are rigidly connected together. In the illustrated embodiment, each of the base part 22, first side part 24a, the second side part 24b, and the pair of end parts 26 is constructed of thin rigid plate material such as steel sheet material. In the illustrated embodiment, the base part 22, first side part 24a, the second side part 24b, and the pair of end parts 26 can be constructed as separate parts fixed to each other or can be integrally formed as a one-piece unitary member.

In the illustrated embodiment, a plurality of holes are formed in the base part 22, first side part 24a, and the second side part 24b. On the other hand, the end parts 26 are free of holes. In the illustrated embodiment, the base part 22 has circular holes formed therein except at end areas as best understood from FIG. 5. Likewise, in the illustrated embodiment, the side parts 24a and 24b have circular holes formed therein, except at end areas. At the end areas of the side parts 24a and 24b, however, unlike the base part 22, longitudinal slots are formed. The longitudinal ends beyond the end areas have holes formed therein like the middle areas. It will be apparent to those skilled in the art from this disclosure that the pattern and shape of holes illustrated herein represent one example of a suitable distributor 20 in accordance with the present invention.

In the illustrated embodiment, the distributor 20 is welded to the upper portion of the shell 10. Alternatively and/or in addition, the distributor 20 may be fixed to support plates (discussed below) of the tube bundle 30. However, this is not necessary in the illustrated embodiment. In addition, it will be apparent to those skilled in the art from this disclosure that the end parts 26 may be omitted if not needed and/or desired. In the illustrated embodiment, the end parts 26 of the distributor 20 are present and have upper ends with curves matching an internal curvature of the cylindrical shape of the cylindrical body 14 shell 10. When the distributor 20 is fixed to the shell 10, upper edges of the side parts 24a and 24b and/or upper edges of the end parts 26 can be attached to the curved internal surface using any suitable conventional technique. Welding is one example. In the illustrated embodiment, the distributor 20 has a length almost as long as an internal length of the shell 10. Specifically, in the illustrated embodiment, the distributor has a length at least about 90% as long as an internal length of the shell 10, e.g., about 95%. Thus, refrigerant is distributed from the distributor 20 along almost an entire length of the tube bundle 30.

Referring again to FIGS. 4-6, the heat transferring unit 30 (tube bundle) will now be explained in more detail. The tube bundle 30 is disposed below the refrigerant distributor 20 so that the refrigerant discharged from the refrigerant distributor 20 is supplied onto the tube bundle 30. The tube bundle 30 includes a plurality of support plates 32, a plurality of heat transfer tubes 34 (mentioned briefly above) that extend generally parallel to the longitudinal center axis C of the shell 10 through the support plates 32, and a plurality of plate support members 36 as best shown in FIGS. 4-6. In the illustrated embodiment, the tube bundle 30 includes five support plates 32. However, it will be apparent to those skilled in the art from this disclosure that the number of the support plates 32 is not limited to this number. In any case, the tube bundle 30 includes at least one support plate 32. The support plates 32 and the plate support members 36 serve as a tube support structure to support the heat transfer tubes 34. In addition, a guide plate 40 is disposed below the tube bundle 30. The guide plate 40 collects condensed liquid (refrigerant) and directs that liquid to the condenser outlet 12a at the bottom of the shell 10.

Figure 7:
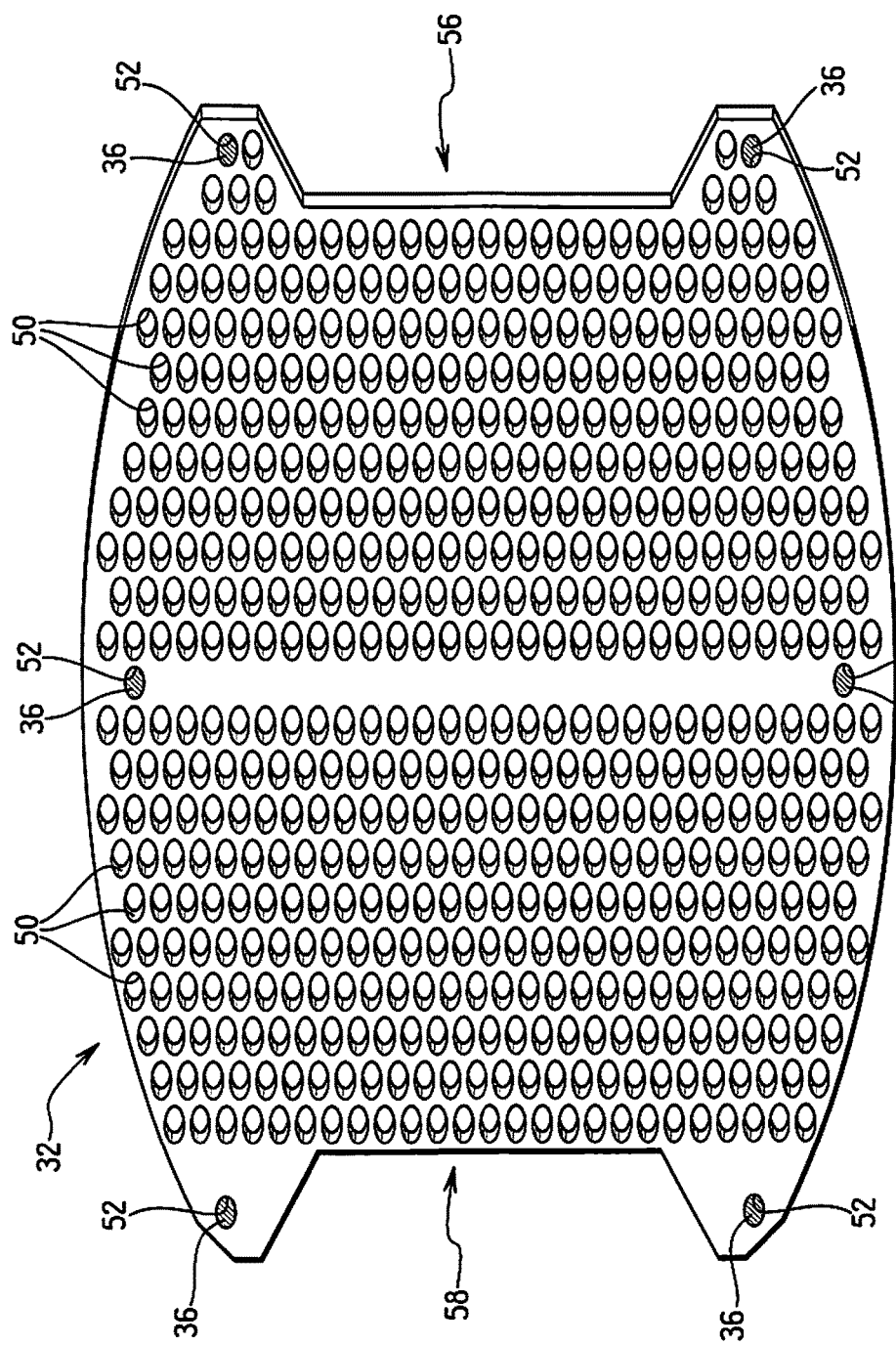
FIG. 7 is a simplified top plan view of a support plate of the tube support structure illustrated in FIGS. 4-6, as seen along section line 7-7 in FIG. 4.

Referring now to FIGS. 4-8, the support plates 32 are shaped to partially match an interior shape of the shell 10 to be fitted therein. As best shown in FIG. 7, each support plate 32 has holes 50 that receive the heat transfer tubes 34, and holes 52 that receive the plate support members 36. Each support plate also has an upper notch 56 at a top thereof and a lower notch 58 at a bottom thereof. The guide plate 40 is disposed under the support plates 32. The heat transfer tubes 34 extend through the holes 50 formed in the support plates 32 so as to be supported by the support plates 32 within the shell 10. The plate support members 36 are attached to the support plates 32 to support and maintain the support plates 32 in the spaced arrangement relative to each other, as shown in FIGS. 4-5. The support plates 32 are arranged at intervals relative to each other along a longitudinal direction of the shell 10. As best understood from FIG. 9A, in the illustrated embodiment, the support plates 32 are arranged at equal intervals "a" relative to each other along the longitudinal direction of the shell 10. The interval "a" between the support plates 32 is determined depending on the number of the support plates 32 and the length of the shell 10. Once the support plates 32 and the plate support members 36 are attached together as a tube support structure (e.g., by welding), the tube support structure can be inserted into the cylindrical body 14 and can be attached thereto, as explained below in more detail.

Referring still to FIGS. 4-8, the support plates 32 are identical to each other. Each support plate 32 is preferably formed of a rigid sheet material such as sheet metal. Thus, each support plate 32 has a planar shape and includes curved sides shaped to match an interior curvature of the shell with the upper notch 56 and the lower notch 58 extending generally toward each other. As best shown in FIGS. 4-6, each support plate 32 extends from above the tube bundle 30 to below the tube bundle 30. Due to the mating curved shapes of the support plates 32 and the cylindrical body 14, the support plates 32 are prevented from moving vertically, laterally, etc. (e.g., in any direction transverse to the longitudinal center axis C) relative to the cylindrical body 14. The guide plate 40 is disposed under the support plates 32. The guide plate 40 can be fixed to the cylindrical body 14 or may merely rest inside the cylindrical body 14. Likewise, the guide plate 40 may be fixed to the support plates 32 or the support plates 32 may merely rest on the guide plate 40. In the illustrated embodiment, guide plate 40 is fixed (e.g., welded) to the cylindrical body 14 before assembly of the support plates 32 and the plate support members 36 is inserted and attached to the cylindrical body 14. In the illustrated embodiment, once the assembly of the support plates 32 and the plate support members 36 are attached together (e.g., by welding), the assembly is inserted into the cylindrical body 14 on top of the guide plate 40, and then the end ones of the support plates 32 are welded to the cylindrical body 14 of the shell 10.

The upper notches 56 of the support plates 32 form a recess shaped to make space for the distributor 20. As mentioned above, the distributor 20 is welded to the cylindrical body 14 such that the distributor 20 is disposed within the upper notches 56. Of course, alternatively, it will be apparent to those skilled in the art from this disclosure that the distributor 20 may be fixed to the support plates 32 or the distributor 20 may rest on the support plates 32. In the illustrated embodiment, the support plates 32 are not fixed to the distributor 20 so that the distributor 20 can be attached to the cylindrical body 14 before or after the tube bundle 30 as a unit. The lower notches 58 of the support plates 32 together form a fluid flow channel. The guide plate 40 is mounted within the shell 10 to extend parallel to the longitudinal center axis C and parallel to the plane P under the support plates 32 as mentioned above.

The support plates 32 are inclined relative to a vertical direction perpendicular to the longitudinal center axis C of the shell 10. In the illustrated embodiment, each support plate 32 is inclined at an angle α relative to the vertical direction perpendicular to the longitudinal center axis C of the shell 10. The angle α is in the range of 45 degrees to 80 degrees. Preferably, the angle α is in the range of 50 degrees to 75 degrees. In the illustrated embodiment, the angle α is 60 degrees, which is the middle of a suitable (example) range of 55 degrees to 65 degrees. Each support plate 32 is inclined at the same angle. If the angle α is too small, a covered area by each support plate 32 will not be sufficient, as explained in more detail below. On the other hand, if the angle α is too large, the size of each support plate 32 needs to be large. In addition, if the angle α is too large, liquid refrigerant will not be drained quickly due to the gravity.

As the compressed vapor refrigerant supplied to the tube bundle 30 from the distributor 20 descends over the tube bundle 30, the refrigerant condenses and changes state into liquid refrigerant. This condensed liquid refrigerant is received and collected by the inclined support plates 32 and flows downward along the surface of the inclined support plates 32. The condensed liquid refrigerant then flows along the guide plate 40 toward the ends of the condenser 3. The guide plate 40 is shorter than the cylindrical body 14. Thus, the liquid refrigerant then flows along the bottom of the cylindrical body 14 to the refrigerant outlet 12a. The inclined support plates 32 allow the condensed liquid refrigerant to be drained quickly.

Referring now to FIGS. 4-7, each support plate 32 has the holes 50 formed therein to receive the heat transfer tubes 34 therethrough. The holes 50 of each support plate 32 are configured such that the heat transfer tubes 34 fit into the holes 50. With such an arrangement, the liquid refrigerant does not fall directly from the upper heat transfer tubes 34 to the lower heat transfer tubes 34 through the holes 50. The liquid refrigerant falling directly below will form a thick layer of the liquid refrigerant around the lower heat transfer tubes 34, which will deteriorate the heat transfer performance due to insulation caused by such a layer of the liquid refrigerant. Thus, in the illustrated embodiment, the holes 50 are shaped such that the heat transfer tubes 34 fit thereinto to prevent the liquid refrigerant from falling directly from the upper heat transfer tubes 34 to the lower heat transfer tubes 34 through the holes 50. However, it will be apparent to those skilled in the art from this disclosure that the heat transfer tubes 34 do not need to fit into the holes 50 in a liquid-tight manner and the heat transfer tubes 34 may be disposed in the holes 50 with a loose fit which allows the liquid refrigerant to spill through the holes 50 to some extent.

Each support plate 32 also has the holes 52 that receive the plate support members 36. Specifically, on each side of the tube bundle 30, in the illustrated embodiment, three of the plate support members 36 extend through the holes 52 in the support plates 32 and are fixed to the support plates 32 to maintain the support plates 32 in the spaced arrangement illustrated herein.

As best shown in FIG. 7, each support plate 32 has the upper notch 56 at the top of the support plate 32 and the lower notch 58 at the bottom of the support plate 32. The upper notch 56 and the lower notch 58 extend generally toward each other. As mentioned above, the upper notches 56 of the support plates 32 form a recess shaped to make space for the distributor 20 such that the distributor 20 is disposed within the upper notches 56. The lower notches 58 of the support plates 32 together form a fluid flow channel.

The guide plate 40 can further provide vertical support to the bottom of the tube bundle 30, as best understood from FIGS. 5-6. In the illustrated embodiment, the plate support members 36 are constructed as elongated, rigid, rod-shaped members. One suitable material is steel.

The heat transfer tubes 34 extend through the holes 50 of the support plates 32 so as to be supported by the support plates 32 in the pattern illustrated herein. The heat transfer tubes 34 may be fixed to the support plates 32 or merely supported by the support plates 32. In the illustrated embodiment, the heat transfer tubes 34 only rest on and are not fixed to the support plates 32.

Referring now to FIG. 8, the support plates 32 are arranged to overlap with each other when viewed from above. With such an arrangement, the liquid refrigerant can be prevented from falling downward from the upper heat transfer tubes 34 to the lower heat transfer tubes 34 between the support plates 32 and forming a thick layer of the liquid refrigerant around the lower heat transfer tubes 34. As shown in FIG. 8, the support plates 32 are disposed to cover a majority of the longitudinal center axis C of the shell 10 when viewed from above, except at both end areas of the shell 10. The support plates 32 are preferably disposed to cover about 90% of the longitudinal center axis C of the shell 10 when viewed from above. More preferably, the support plates 32 are disposed to cover about 95% of the longitudinal center axis C of the shell 10 when viewed from above.

As mentioned above, in a case where the inclination angle α of the support plates 32 is too small, a covered area by each support plate 32 will not be sufficient. Thus, a great number of support plates 32 will be needed to cover a majority of the longitudinal center axis C of the shell 10. Accordingly, the angle α is preferably equal to or greater than 45 degrees and more preferably equal to or greater than 50 degrees so that too many support plates 32 will not be needed. Also, the angle α is preferably equal to or less than 80 degrees and more preferably equal to or less than 75 degrees so that the size of each support plate 32 will not be too large and the influence of the gravity will be reduced.

When the angle α is large and the size of each support plate 32 needs to be large, there will be cases in which the space in the shell 10 is insufficient to dispose the entire plates of the support plates 32 within the shell 10. In such cases, a partial plate of the support plate 32 may be used to fill up the remaining space in addition to the entire plate of the support plate 32.

The heat transfer tubes 34 are made of materials having high thermal conductivity, such as metal. The heat transfer tubes 34 are preferably provided with interior and exterior grooves to further promote heat exchange between the refrigerant and the water flowing inside the heat transfer tubes 34. Such heat transfer tubes including the interior and exterior grooves are well known in the art. For example, GEWA-C tubes by Wieland Copper Products, LLC may be used as the heat transfer tubes 34 of this embodiment. As mentioned above, the heat transfer tubes 34 are supported by the plurality of vertically extending support plates 32, which are supported within the shell 10.

As mentioned above, in this embodiment, the tube bundle 30 is arranged to form a two-pass system, in which the heat transfer tubes 34 are divided into a supply line group disposed in a lower portion of the tube bundle 30, and a return line group disposed in an upper portion of the tube bundle 30. As shown in FIG. 4, inlet ends of the heat transfer tubes 34 in the supply line group are fluidly connected to the inlet pipe 17 via the inlet chamber 13d of the connection head member 13 so that water entering the condenser 3 is distributed into the heat transfer tubes 34 in the supply line group. Outlet ends of the heat transfer tubes 34 in the supply line group and inlet ends of the heat transfer tubes 34 of the return line group are fluidly communicated with the return chamber 15c of the return head member 15. Therefore, the water flowing inside the heat transfer tubes 34 in the supply line group is discharged into the return chamber 15c, and redistributed into the heat transfer tubes 34 in the return line group. Outlet ends of the heat transfer tubes 34 in the return line group are fluidly communicated with the outlet pipe 18 via the outlet chamber 13e of the connection head member 13. Thus, the water flowing inside the heat transfer tubes 34 in the return line group exits the condenser 3 through the outlet pipe 18.

Figure 11:
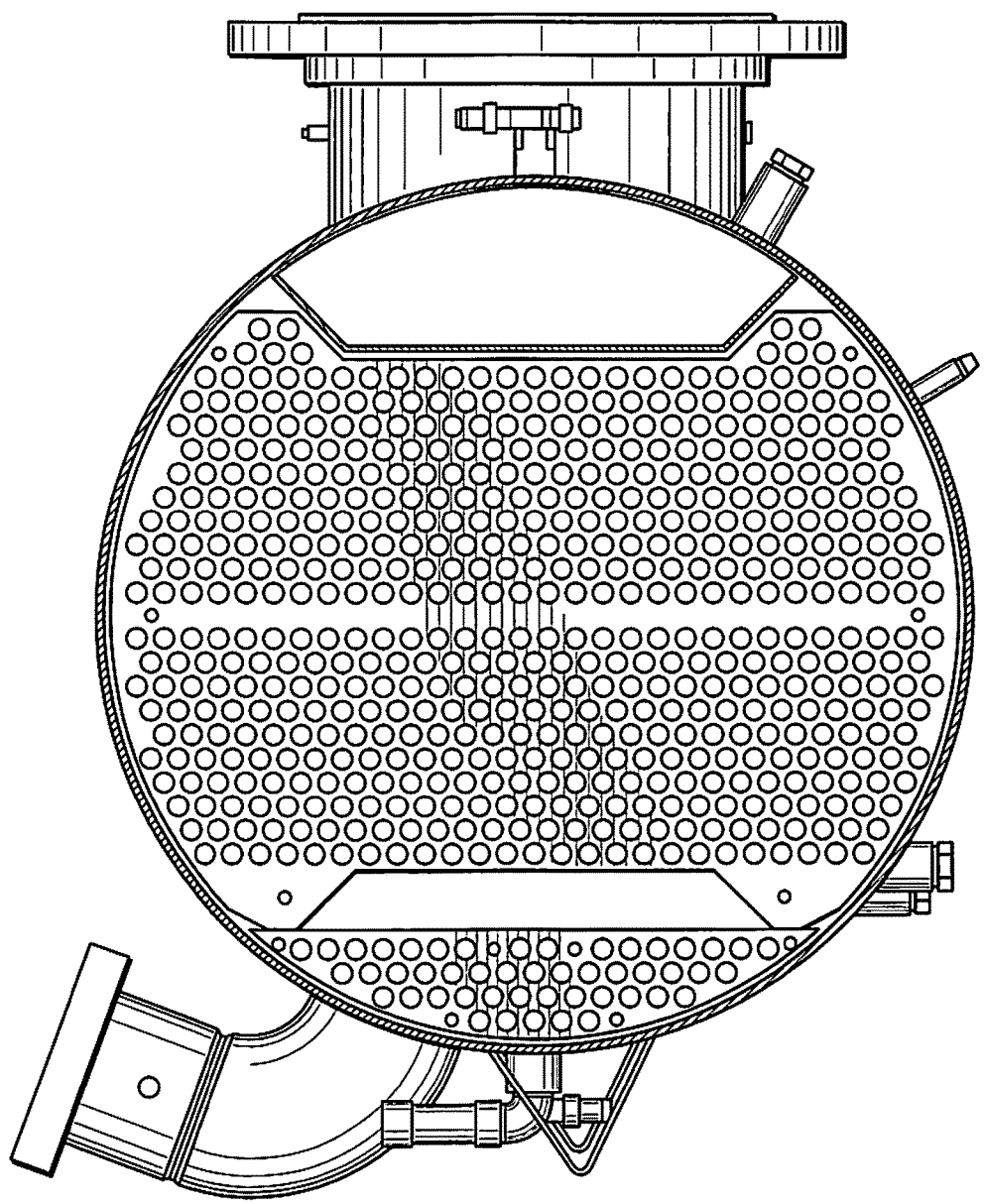
FIG. 11 is a simplified transverse cross sectional view of a condenser in which a number of tubes is maximized but a flow path is not provided.

Although, in this embodiment of FIGS. 1-6, there are no heat transfer tubes disposed under the guide plate 40 (i.e., there is no sub-cooler below the guide plate 40), it will be apparent to those skilled in the art from this disclosure that the supply line group may include an additional group of plates and tubes under the guide plate 40 (i.e., a sub-cooler below the guide plate 40), such as is illustrated in FIG. 11. With such an arrangement, communicating holes should be formed at the bottom of the plates under the guide plate 40 or cutouts should be formed so that liquid refrigerant can flow along the bottom of the condenser to the refrigerant outlet 12a. Refrigerant should already be liquid once the refrigerant has descended to the guide plate 40. Thus, additional heat transfer tubes under the guide plate 40 can be used in order to further lower the temperature of the liquid under the guide plate 40 (i.e., to sub-cool) before exiting the condenser. In addition, it will be apparent to those skilled in the art from this disclosure, that an additional outlet from the condenser 3 can be provided if a supply of condensed liquid refrigerant is needed for some other purpose (e.g., for motor cooling or any other purpose). Such an additional outlet from the condenser is shown in FIG. 11.

Referring to still FIGS. 4-6, assembly of the condenser 3 will now be explained in more detail. The plate support members 36 are attached to the support plates 32 (e.g., by welding) to form a tube support structure. The guide plate 40 can be inserted in and fixed (e.g., welded) to the shell 10 before or after assembly of the support plates 32 and the plate support members 36. Similarly, the distributor 20 can be inserted in and fixed (e.g., welded) to the shell 10 before or after the assembly of the support plates 32 and the plate support members 36. In any case, the assembled tube support structure including the support plates 32 and the plate support members 36 is inserted into the cylindrical body 14, after attaching the distributor 20 and the guide plate 40 in the illustrated embodiment. The end pieces of the support plates 32 are then fixed (e.g., welded) to the cylindrical body 14. Next, the tube sheets 13a and 15a are attached (e.g., by welding) to the cylindrical body 14. Next, the heat transfer tubes 34 are inserted through the holes in the tube sheets 13a and 15a and through the holes 50 in the support plates 32. The heat transfer tubes 34 can then be roller expanded into the tube sheets 13a and 15a to secure the heat transfer tubes 34. This is merely one example of how the condenser of the illustrated embodiment can be assembled. However, it will be apparent to those skilled in the art from this disclosure that other assembly techniques and/or orders of insertion and attachment are possible without departing from the scope of the instant application.

Figure 9B:
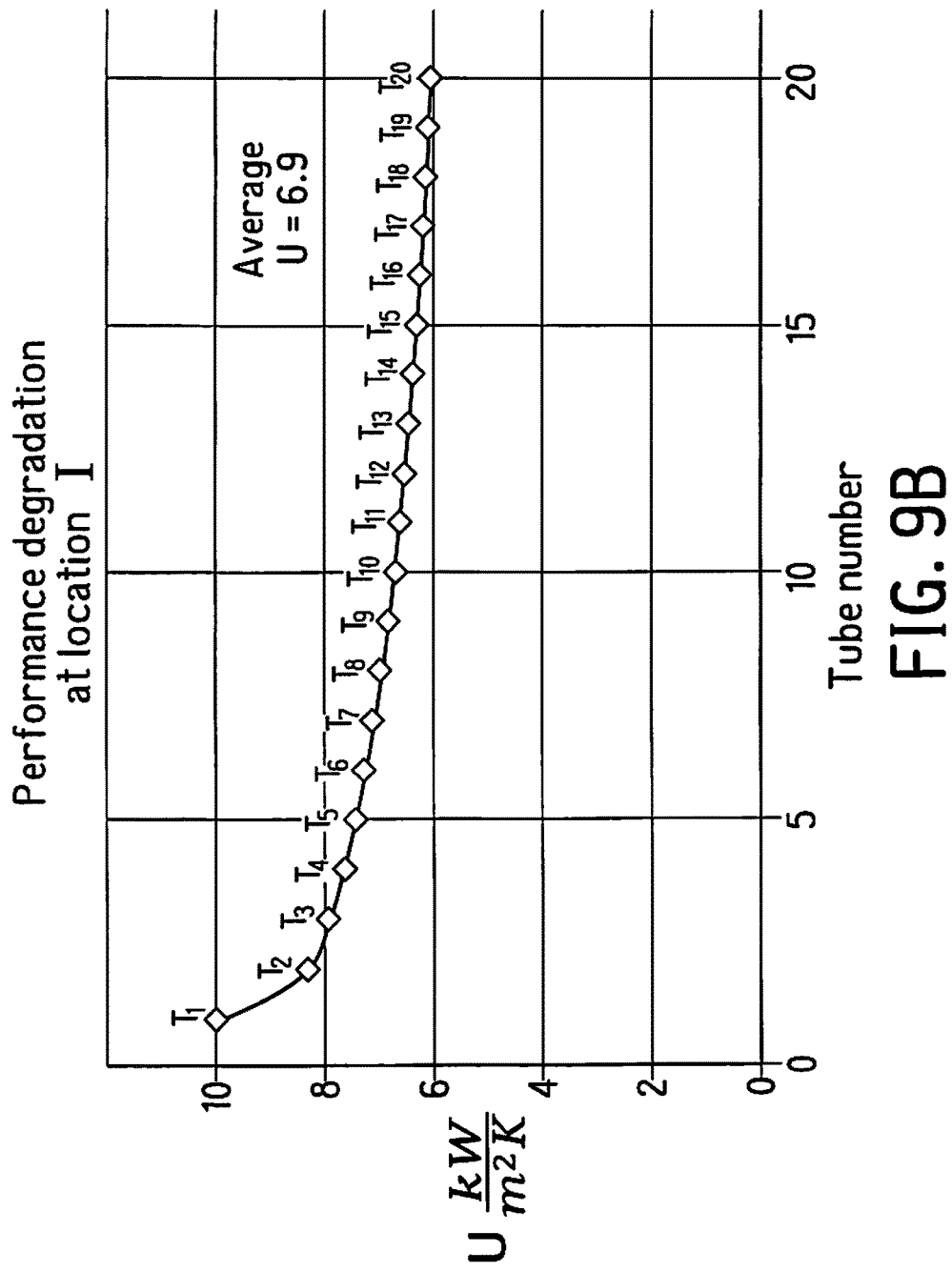
FIG. 9B is a graph illustrating heat transfer performance at location I in FIG. 9A.
Figure 9C:
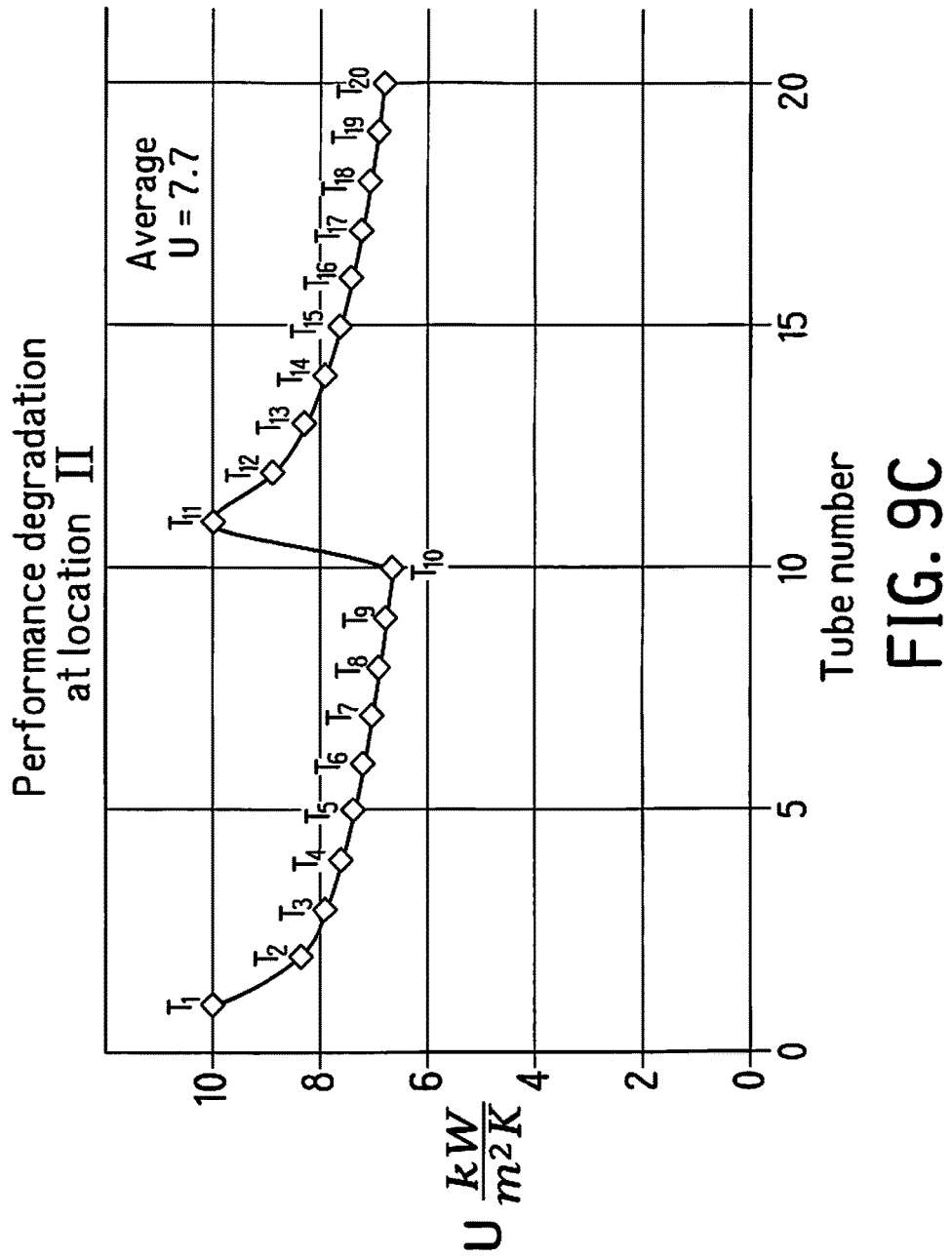
FIG. 9C is a graph illustrating heat transfer performance at location II in FIG. 9A.

Referring now to FIGS. 9A-9C, FIG. 9B is a graph illustrating heat transfer performance at location I in FIG. 9A and FIG. 9C is a graph illustrating heat transfer performance at location II in FIG. 9A. In FIGS. 9B and 9C, "U" refers to the heat transfer coefficient. In the illustrated embodiment, twenty tiers of the heat transfer tubes 34 are aligned when viewed from side as shown in FIG. 9A. More specifically, the upper group of the heat transfer tubes 34 includes ten tube tiers $T_1$ to $T_{10}$ and the lower group of the heat transfer tubes 34 includes ten tube tiers $T_{11}$ to $T_{20}$. As best understood from FIG. 9A, the upper and lower groups of the heat transfer tubes 34 (tube tiers $T_1$ to $T_{20}$) are not covered by the support plate 32 at location I. On the other hand, although the upper group of the heat transfer tubes 34 (tube tiers $T_1$ to $T_{10}$) is not covered by the support plate 32 at location II, the lower group of the heat transfer tubes 34 (tube tiers $T_{11}$ to $T_{20}$) is covered by the support plate 32 at location II. The graph in FIG. 9B shows that the heat transfer performance degrades gradually from the upper heat transfer tubes 34 to the lower heat transfer tubes 34 (from tube tier $T_1$ to tube tier $T_{20}$) at location I. The degradation in the heat transfer performance at location I is due to the thickness of a liquid refrigerant layer formed around the lower heat transfer tube 34 which increases and causes an insulation effect lowering the heat transfer permeation. As shown in FIG. 9B, the average heat transfer coefficient U is 6.9 at location I. On the other hand, the graph in FIG. 9C shows that the heat transfer performance improves at the beginning of the lower group of the heat transfer tubes 34 (i.e., at tube tier $T_{11}$) and the performance degradation is reduced overall at location II. The support plate 32 is allowed to catch and drain the liquid refrigerant, which does not allow the thickness of a liquid refrigerant layer to build up, and the insulation effect is eliminated as much as possible allowing the tubes to regain full heat transfer at location II. As shown in FIG. 9C, the average heat transfer coefficient U is 7.7 at location II.

Referring now to FIG. 10, FIG. 10 illustrates a relationship of COP (Coefficient of Performance) versus U (Heat Transfer Performance). As can be seen in FIG. 10, as the heat transfer performance gets larger, COP gets larger. Therefore, it has been discovered that it is desirable to improve the heat transfer performance in the heat transfer tubes 34 of the tube bundle 30. It has further been discovered that by providing the inclined support plates 32 the heat transfer performance can be improved. For example, as shown in FIGS. 9A-9C, the heat transfer performance of the heat transfer tubes 34 at location II is improved by providing the inclined support plate 32 compared to the heat transfer tubes 34 at location I. As shown in FIG. 10, the average heat transfer coefficient U at location II (Present Invention) achieves large COP compared to the average heat transfer coefficient U at location I (Prior Art).

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiments, the following directional terms "upper", "lower", "above", "downward", "vertical", "horizontal", "below" and "transverse" as well as any other similar directional terms refer to those directions of a condenser when a longitudinal center axis thereof is oriented substantially horizontally as shown in FIGS. 4 and 5. Accordingly, these terms, as utilized to describe the present invention should be interpreted relative to a condenser as used in the normal operating position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A condenser adapted to be used in a vapor compression system, the condenser comprising:
   a shell having a refrigerant inlet that at least refrigerant with gas refrigerant flows therethrough and a refrigerant outlet that at least refrigerant with liquid refrigerant flows therethrough, with a longitudinal center axis of the shell extending generally parallel to a horizontal plane;
   a tube bundle including a plurality of heat transfer tubes disposed inside of the shell to receive the refrigerant discharged from the refrigerant inlet onto the tube bundle, the heat transfer tubes extending generally parallel to the longitudinal center axis of the shell; and
   a tube support structure configured and arranged to support the plurality of heat transfer tubes in the tube bundle within the shell,
   the tube support structure including a plurality of tube support plates arranged at intervals relative to each other along a longitudinal direction of the shell, each tube support plate being inclined relative to a vertical direction perpendicular to the longitudinal center axis of the shell, and
   the plurality of tube support plates being arranged to overlap with each other when viewed from above along the vertical direction, with a top end of a single plate of the plurality of tube support plates overlapping with a bottom end of only one adjacent single plate of the plurality of tube support plates located next along the longitudinal direction of the shell.

2. The condenser according to claim 1, wherein each of the plurality of tube support plates is planar.

3. The condenser according to claim 1, wherein each of the plurality of tube support plates extends from above the tube bundle to below the tube bundle.

4. The condenser according to claim 1, wherein each of the plurality of tube support plates has holes that receive the plurality of heat transfer tubes in the tube bundle.

5. The condenser according to claim 4, wherein the holes of each of the plurality of tube support plates have the plurality of heat transfer tubes fitted into the holes.

6. The condenser according to claim 1, wherein each of the plurality of tube support plates is inclined at an angle of 45 degrees to 80 degrees relative to a vertical direction perpendicular to the longitudinal center axis of the shell.

7. The condenser according to claim 1, wherein each of the plurality of tube support plates is inclined at an angle of 50 degrees to 75 degrees relative to a vertical direction perpendicular to the longitudinal center axis of the shell.

8. The condenser according to claim 1, wherein the plurality of tube support plates are arranged at equal intervals relative to each other along the longitudinal direction of the shell.

9. The condenser according to claim 1, wherein the plurality of tube support plates are disposed to cover a majority of the longitudinal center axis of the shell when viewed from above.

10. The condenser according to claim 1, wherein the plurality of tube support plates are inclined at a same angle relative to the longitudinal center axis of the shell.

11. The condenser according to claim 1, wherein each of the plurality of tube support plates has a notch at a top thereof.

12. The condenser according to claim 1, wherein each of the plurality of tube support plates has a notch at a bottom thereof.

13. The condenser according to claim 1, wherein the tube support structure includes a plate support member extending generally parallel to the longitudinal center axis of the shell, the plate support member supporting the plurality of tube support plates.

14. The condenser according to claim 1, wherein the refrigerant is R1233zd.

\* \* \* \* \*